(12) United States Patent
Nunn

(10) Patent No.: US 7,771,254 B2
(45) Date of Patent: Aug. 10, 2010

(54) APPARATUS FOR THE PRODUCTION OF MEAT PRODUCTS

(75) Inventor: Michael Nunn, Patterson Lakes (AU)

(73) Assignee: The Beef Company Pty Ltd, Wagga Wagga, New South Wales (AU)

( * ) Notice: Subject to any disclaimer, the term of this patent is extended or adjusted under 35 U.S.C. 154(b) by 1566 days.

(21) Appl. No.: 10/482,684

(22) PCT Filed: Jun. 28, 2002

(86) PCT No.: PCT/AU02/00836

§ 371 (c)(1),
(2), (4) Date: Oct. 28, 2004

(87) PCT Pub. No.: WO03/003840

PCT Pub. Date: Jan. 16, 2003

(65) Prior Publication Data

US 2005/0068848 A1 Mar. 31, 2005

(30) Foreign Application Priority Data

Jul. 3, 2001 (AU) .................................. PR6068

(51) Int. Cl.
*A22C 11/00* (2006.01)
(52) U.S. Cl. ........................................................ 452/30
(58) Field of Classification Search ............. 452/21–26, 452/30–32, 37–39, 46, 51
See application file for complete search history.

(56) References Cited

U.S. PATENT DOCUMENTS

| 4,356,206 | A | | 10/1982 | Boldt |
| 4,567,050 | A | | 1/1986 | Roth |
| 5,131,883 | A | * | 7/1992 | Hendriks et al. ............... 452/21 |
| 5,205,777 | A | | 4/1993 | Hohenester |
| 7,381,122 | B2 | * | 6/2008 | Lagares Corominas ...... 452/30 |
| 2004/0238328 | A1 | | 12/2004 | Madsen et al. |

FOREIGN PATENT DOCUMENTS

WO  WO 86/07240 A  12/1986
WO  WO 98/46086 A  10/1998

OTHER PUBLICATIONS

Derwent Abstract Accession No. 97-200535/18, RU 2066102C (Meat Ind Rest Inst); Sep. 10, 1996.

* cited by examiner

*Primary Examiner*—Thomas Price
(74) *Attorney, Agent, or Firm*—Kilpatrick Stockton LLP

(57) ABSTRACT

An apparatus (10) for the production of meat products includes a support structure (12). A container (14) is mounted on the support structure (12). A conveyor (20) has a first, upstream end (20.1) in communication with the container (14) and a second, downstream end (20.2) arranged downstream of the first end (20.2) and outside the container (14). A comb (34) is arranged downstream of the second end (20.2) of the conveyor (20) for working meat pieces conveyed to the comb (34) by the conveyor (20). The comb (34) is operable independently of the conveyor (20). A processing station (40) is arranged downstream of the comb (34), the processing station (40), together with the comb (34), processing the meat to obtain a desired finished product.

16 Claims, 2 Drawing Sheets

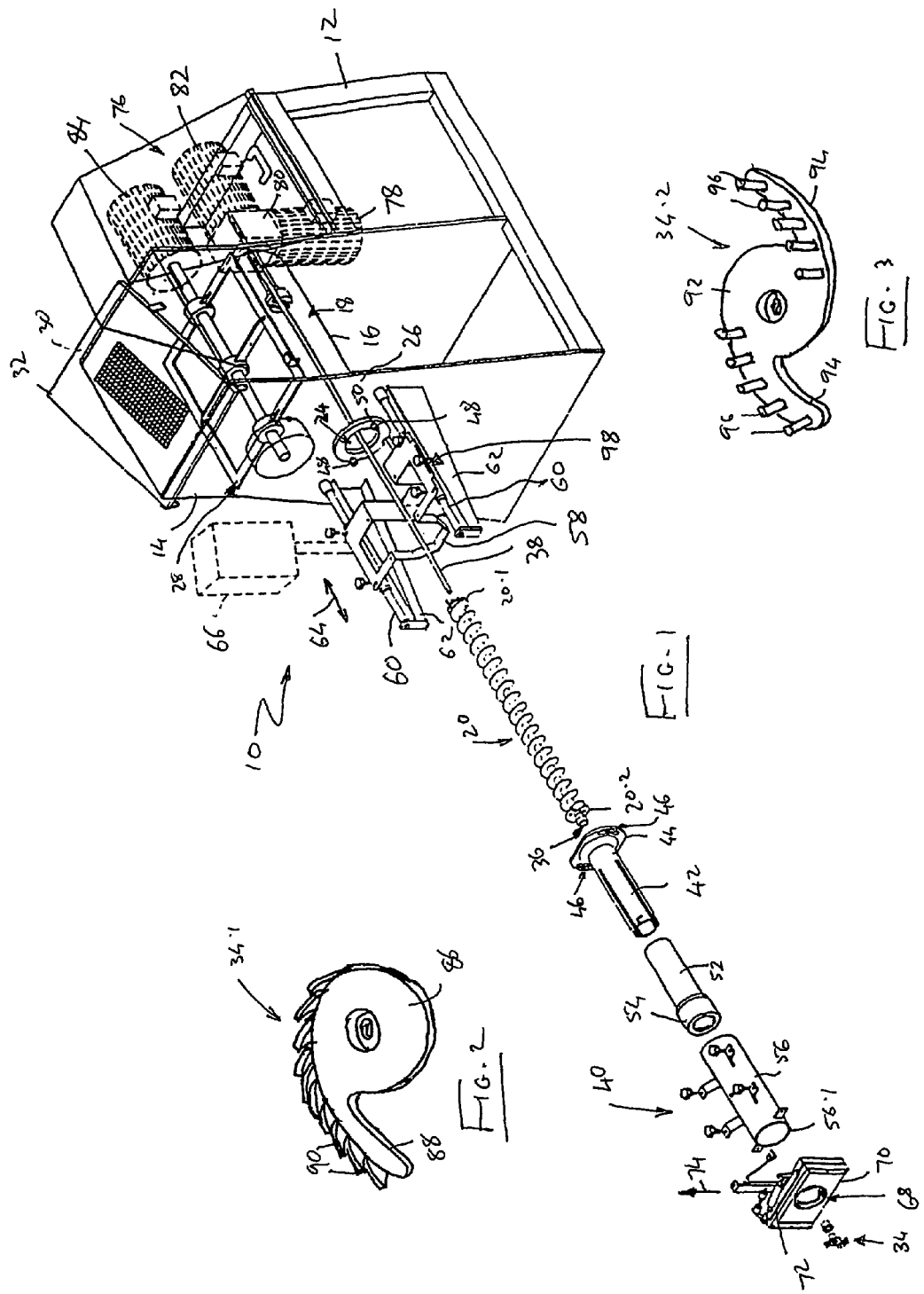

APPARATUS FOR THE PRODUCTION OF MEAT PRODUCTS

CROSS REFERENCE TO RELATED APPLICATIONS

This application is the U.S. national phase of International Application No. PCT/AU02/00836 filed on Jun. 28, 2002, which application claims priority to Australian Application No. PR6068 filed on Jul. 3, 2001, the contents of which are incorporated by reference herein.

FIELD OF THE INVENTION

The present invention relates to an apparatus for the production of meat products and, more particularly, restructured and extended meat products. The invention extends also to meat products produced by such an apparatus.

BACKGROUND TO THE INVENTION

Meat derived from livestock such as cattle, sheep, pigs, and the like varies considerably as between the various muscle masses in any given animal as does meat derived from birds and fish. The meat also often varies considerably as between different animals of the same species. These variations make it difficult for the meat trade to offer to the public an essentially consistent meat product or for those selling processed or cooked meat products to offer a standardised, portion controlled, product. As used in this specification, "meat" is taken to mean any proteinaceous muscle mass including the flesh of fish, molluscs, crustaceans and birds.

One type of meat product that attempts to address the above noted problems is extended meat products. By "extended", it is understood that the meat product incorporates additives that constitute a certain proportion of the final meat product. For example, a typical extended pressed ham meat product may comprise a ratio of 100 parts pork to 50 parts aqueous solution. This product is known in the art as a 50% extension. Products up to 150% extension are produced commercially. Another type of meat product is a restructured product where meat pieces are worked to provide a meat product of uniform quality.

Currently, pressed ham and related products are manufactured in a batch process by tumbling the meat pieces with curing and binding solutions in a cylindrical tumbler for up to 16 hours. These cylindrical tumblers are known in the art as "massagers" and must be operated under refrigerated conditions. Tumblers having a capacity of up to 6000 liters are known.

The principle behind "massaging" is to extract the available meat protein which then assists in agglomerating the meat pieces together to form the pressed, cured meat product, such as ham and corned beef when cooked.

SUMMARY OF THE INVENTION

According to the invention, there is provided an apparatus for the production of meat products, the apparatus including:
a support structure;
a container mounted on the support structure;
a conveying means having a first, upstream end in communication with the container and a second, downstream end arranged downstream of the first end and outside the container;
a working means arranged downstream of the second end of the conveying means for working meat conveyed to the working means by the conveying means, the working means being operable independently of the conveying means; and
a processing station arranged downstream of the working means, the processing station, together with the working means, processing the meat to obtain a desired finished product.

The support structure may be a cabinet. The container may be a feed hopper mounted on the cabinet. An agitating means may be carried in the feed hopper. The agitating means may be a paddle rotatably mounted in the feed hopper. When the product being produced is an extended meat product, the paddle may mix non-meat ingredients and additives into the meat. Such additives may include curing and binding agents, such as water, nitrite, phosphates, seasonings, spices, sugars, thickening agents and proteinaceous substances such as soy, gluten and plasma. The applicant has, surprisingly, found that with the apparatus of the invention, the need for phosphates may be obviated in the production of extended meat products.

The conveying means may be a screw conveyor or auger. Preferably, the screw conveyor is a variable pitch screw conveyor. The first end of the screw conveyor may be received in a bottom of the feed hopper, the screw conveyor having a part extending through an opening in a wall, preferably a side wall, of the feed hopper.

The part of the screw conveyor extending beyond the container may be housed in a tubular member mounted about the opening of the hopper.

The processing station may comprise a housing, in the form of a sleeve, displaceably arranged relative to the tubular member, the housing defining a discharge opening, downstream of the working means, through which the finished product is discharged. The tubular member may have a low friction element, such as a polytetrafluoroethylene (PTFE) bush, arranged at a downstream end of the tubular member, the sleeve of the processing station being slidably supported on the low friction element.

The processing station may further comprise a pressurising means for pressurising the meat in the processing station. The pressurising means may be a pressure plate which openably closes the discharge opening of the housing.

The pressure plate may be slidably received in a holder fast with a downstream end of the sleeve. The plate may be slidable to selectively open and close the discharge opening. The closing of the discharge opening may cut a length of meat product discharged through the discharge opening from a remainder of a meat product in the processing station.

The sleeve may be supported on a carriage which is displaceably arranged relative to the cabinet.

The processing station may include a control means for controlling displacement of the carriage and, hence, the sleeve relative to the tubular member for controlling pressure applied to meat in the processing station. The control means may be a fluid operable control means. More particularly, the control means may be a pair of pneumatic rams which support the carriage to impart a predetermined pressure via the pressure plate to the meat product in the processing station.

The working means may be in the form of a comb arranged proximate the second end of the screw conveyor The comb may be mounted at the end of a comb shaft, the comb shaft being co-axially received in a hollow, rotational shaft of the screw conveyor.

The apparatus may include a drive arrangement, the drive arrangement comprising a first drive means for rotatably driving the screw conveyor and a second drive means for rotatably driving the comb shaft, independently of the screw conveyor. The first drive means and the second drive means may each be a variable speed motor. The drive arrangement may include a third drive means, which may also be a variable speed motor, for rotatably driving the paddle in the hopper. All the motors may be inverter controlled.

The invention extends also to a meat product produced by an apparatus as claimed in any one of the preceding claims. The meat product may be an extended meat product. The meat product is, preferably, substantially phosphate-free.

BRIEF DESCRIPTION OF THE DRAWINGS

The invention is now described by way of example with reference to the accompanying drawings in which:

FIG. 1 shows a three dimensional, exploded view of an apparatus, in accordance with the invention, for the production of meat products;

FIG. 2 shows a three dimensional view of one type of working means for use with the apparatus of FIG. 1;

FIG. 3 shows a three dimensional view of another type of working means for use with the apparatus of FIG. 1.

DETAILED DESCRIPTION OF THE INVENTION

Figure 4:
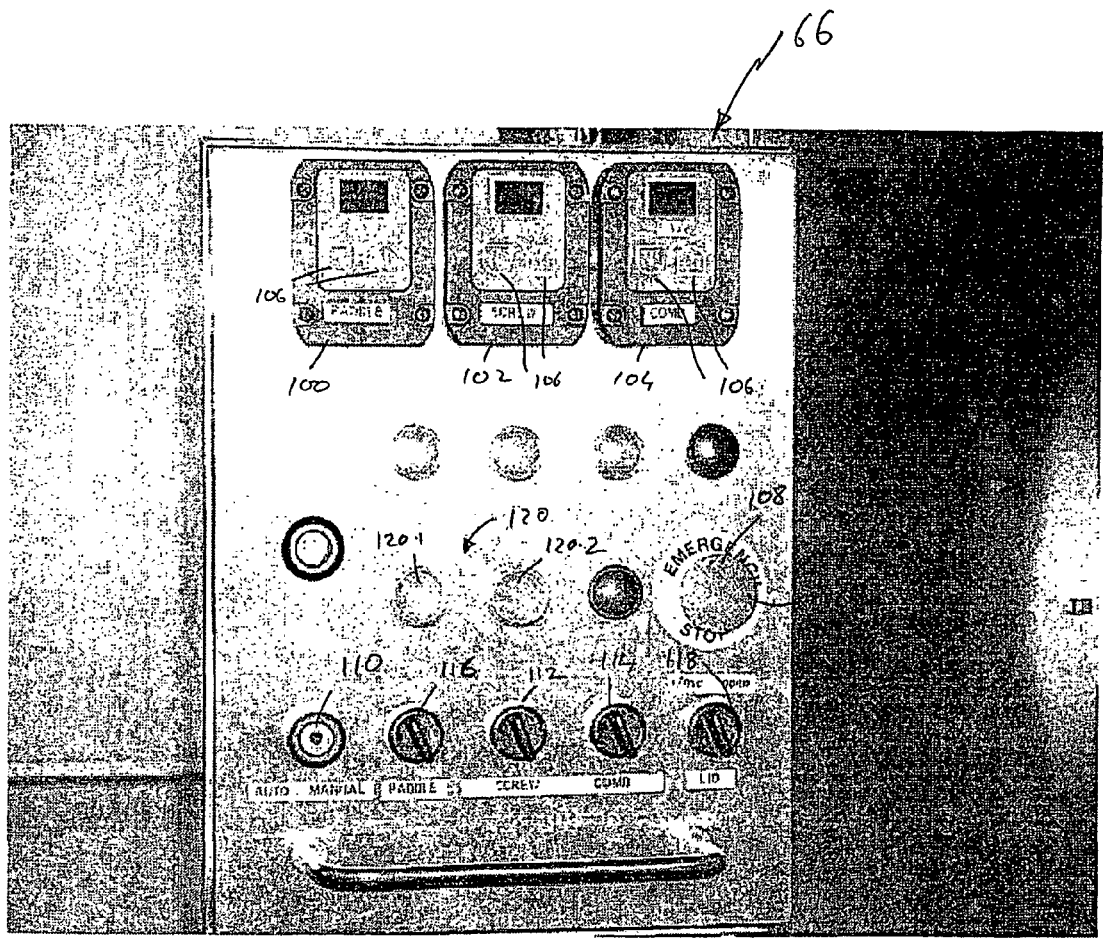
FIG. 4 shows a front view of a control panel of the apparatus.

In the drawings, reference numeral 10 generally designates an apparatus, in accordance with the invention, for the production of meat products.

The apparatus 10 includes a support structure in the form of a cabinet 12. A container in the form of a feed hopper 14 is mounted on the cabinet 12. The container has a rounded bottom region 16 defining a conveyor chamber 18.

A conveying means in the form of a screw conveyor 20 is received in the conveyor chamber 18 with a first end 20.1 of the screw conveyor being received at an upstream end of the conveyor chamber 18 and a second, downstream end 20.2 of the conveyor 20 projecting through an opening 24 in a side wall 26 of the cabinet 12.

An agitating means in the form of a paddle 28 is rotatably supported in the feed hopper 14. The feed hopper 14 has an access opening 30 closed off by a lid 32.

The apparatus 10 includes a working means in the form of a comb 34 arranged downstream of the end 20.2 of the conveyor 20. The comb 34 is, as will be described in greater detail below, used for working meat pieces and for orientating fibres of the meat pieces.

The screw conveyor 20 has a hollow core defining a passage 36 through the screw conveyor 20. A shaft 38 extends through the passage 36. The comb 34 is mounted on a downstream end of the shaft 38, the downstream end of the shaft 38 protruding beyond the end 20.2 of the screw conveyor 36.

The comb 34 forms an upstream end of a processing station 40.

The end of the screw conveyor 20 projecting through the opening 24 in the side wall 26 of the cabinet 12 is received in a first tubular member 42. The tubular member 42, at its upstream end, carries a mounting flange 44. The mounting flange 44 has a pair of opposed mounting formations 46 in the form of bayonet slots. The mounting formations 46 engage with corresponding formations 48 on a boss 50 surrounding the opening 24 for removable mounting of the first tubular member 42 in a cantilever fashion from the side wall 26 of the cabinet 12. A second tubular member 52 is removably received over the first tubular member 42. The second tubular member 52 is releasably mounted on the first tubular member 42. It will be appreciated that the tubular members 42 and 52 are removably mounted relative to the cabinet 12 for facilitating demounting of the various components of the apparatus 10 for cleaning and maintenance purposes.

A downstream end of the second tubular member 52 supports a low friction element, such as a polytetrafluoroethylene (PTFE) bush 54.

The processing station 40 comprises a housing in the form of a sleeve 56 slidably received on the bush 54 of the tubular member 52. The sleeve 56 is fixedly mounted on a carriage 58. The carriage 58, in turn, is slidably supported on a pair of opposed fluid-operable rams 60. More particularly, the rams 60 are pneumatic rams. Each ram 60 is mounted on a beam 62. The beams 62 extend cantilever-fashion from the side wall 26 of the cabinet 12, the beams 62 being arranged on opposed side of the opening 24 in the side wall 26 of the cabinet 12.

The rams 60 control the movement of the carriage 58 in an axial direction as indicated by arrows 64. The rams 60 are controlled via a control panel indicated schematically at 66. The pressure imparted by the processing station 40 to meat products being processed in the processing station 40 is controlled by the rams 60, as will be described in greater detail below.

The sleeve 56 of the processing station 40 defines a discharge opening 56.1. The discharge opening 56.1 lies in register with an opening 68 defined in a holder 70 mounted to the downstream end of the sleeve 56. The holder 70 supports a pressurising means in the form of a pressure plate 72. The pressure plate 72 is slidably arranged relative to the holder 70 to selectively open and close the opening 68 to discharge processed meat product from the processing station 40. The plate 72 is shown in its closed, pressurising position relative to the holder 70. The plate 72 rises in the direction of the arrow 74 to open the openings 56.1 and 68 to discharge the processed meat product from the processing station 40.

The apparatus 10 includes a drive arrangement 76. The drive arrangement 76 includes a first drive motor 78 for rotatably driving the screw conveyor 20 via a gearbox 80. The drive arrangement 76 includes a second drive motor 82 for rotatably driving the comb 34, through the gearbox 80 and via its shaft 38, independently of the screw conveyor 20. Finally, the driver arrangement 76 includes a third drive motor 84 for rotatably driving the paddle 28 in the feed hopper 14. It is to be noted that each of the screw conveyor 20, the comb 34 and the paddle 28 are able to be driven independently of one another. The motors 78, 82 and 84 are controlled via the control panel 66. Each motor 78, 82, 84 is fitted with an inverter to enable the motors 78, 82, 84 to run from approximately 1% of rated motor speed up to 100% of rated motor speed. For example, each motor may have a maximum rotational speed of 1400 revolutions per minute (rpm). Thus, the motors 78, 82 and 84 can be driven to run from 14 rpm up to 1400 rpm via the control panel 66. In addition, the rams 60 are fitted with controllers (not shown) to permit the carriage 58 to move under the effect of a variable pressure, as selected via the control panel 66, so that the pressure imparted by the plate 72 on meat pieces in the processing station 40 can be adjusted. The rams 60 can be set to impart almost no pressure or a pressure of up to 600 kPa to the carriage 58 and, accordingly, the pressure plate 72 of the processing station 40. The carriage 58 includes an adjustment setting 98 for adjusting a stroke the carriage 58.

Referring to FIG. 2 of the drawings, a first comb 34.1 is shown. This comb 34.1 comprises a disk 86 with an arm 88 extending from the disk 86. A plurality of saw tooth-like teeth 90 extend about a part of periphery of the disk 86 and arm 88. The comb 34.1 is used in restructuring meat products, as will be described in greater detail below.

Referring to FIG. 3 of the drawings, a second comb 34.2 is shown. This comb 34.2 includes a disk 92 and a pair of opposed arms 94 extending from the disk 92. Each of the arms 94 supports a plurality of prongs or teeth 96 standing proud of the arms 94. The comb 34.2 is used for forming extended meat products, as will also be described in greater detail below.

Referring now to FIG. 4 of the drawings, the control panel 66 is described in greater detail. The control panel 66 includes three meters 100, 102, and 104 for the paddle 28, the screw conveyor 20 and the comb 34, respectively. By means of appropriate switches 106 on each meter 100, 102 and 104, the appropriate rotational speeds of the drive motors 78, 82 and 84 can be set.

The control panel 66 also includes an emergency stop switch or button 108 and a key-operable operating switch 110.

Each driver motor 78, 82 and 84 has a control switch 112, 114 and 116, respectively.

The control panel 66 also includes a control switch 118 for locking and unlocking the lid 32 of the feed hopper 14.

Finally, the control panel includes an on/off switch set 120 comprising an "on" switch 120.1 and an "off" switch 120.2.

To operate the apparatus 10, the appropriate comb 34 is selected. As indicated above, if a restructured meat product is to be made, the comb 34.1 is used. If an extended meat product is to be made, the comb 34.2 is used.

When the carriage 58 is in its rearmost position, the end of the shaft 38 can be accessed through the opening 68 in the holder 70 by raising the pressure plate 72. Accordingly, the pressure plate 72 is raised and the appropriate comb 34.1 or 34.2 is mounted on the end of the shaft 38.

The rams 60 are connected to a source of compressed air and the apparatus 10 is connected to an electrical power outlet.

A "return" stroke of the carriage 58 is regarded as one where the carriage moves towards the cabinet 12 and a "forward" stroke of the carriage 58 is a movement of the carriage in the opposite direction.

As an initial step, the pressure imparted by the carriage on the meat product being processed in the processing station 40 is set by appropriate controls (not shown) to the desired pressure, for example, between about 300 and 400 kPa. The air pressure is checked on an air pressure gauge for the return stroke. The air pressure on the return stroke can be adjusted during operation to achieve the desired finish of the meat product being processed.

The air pressure on the forward stroke is set to zero and is checked on a forward stroke air pressure gauge (also not shown).

The stroke of the carriage 58 is set by the adjustment setting 98.

An operating key is inserted into the key switch 110 and the key switch 110 is set to its "Manual" position. The emergency stop switch 108 is depressed to provide power to the machine.

The desired rotational speeds of the paddle 28, screw conveyor 20 and comb 34 are set via the meters 100, 102 and 104 respectively, using the switches 106.

The switches 112, 114 and 116 are then operated by turning them to their "on" positions to ensure that each of the screw conveyor 20, the comb 34 and the paddle 28 is operating. Once satisfied that they are operating, the switches 112, 114 and 116 are turned to their "off" positions.

The lid 32 of the feed hopper 14 is turned to its "open" position and meat product to be processed and, where an extended meat product is to be formed, the appropriate additives, are fed into the feed hopper 14. The lid 32 is then closed and locked by means of the switch 112. The emergency stop switch 108 is again operated to turn power to the apparatus 10 off.

Once it is desired to start processing the meat product, the operating switch 110 is set to its "auto" position. In this position, all the drive motors 78, 82 and 84 operate automatically to the preset speeds once power is engaged. The power is engaged by again depressing the emergency stop switch 108 and pressing the "on" switch 120.1 to begin processing of the product. During operation of the apparatus 10, the pressure imparted by the processing station 40 on the meat pieces being processed and the speeds of rotation of the conveyor 20, the comb 34 and the paddle 28 can be adjusted and it is not necessary to deactivate the apparatus 10 to effect these adjustments. In other words, after an initial output of the processed meat product has been sampled, any adjustments can be made while the apparatus 10 is still powered.

The apparatus 10 includes safety interlocks. Accordingly, should the lid 32 of the apparatus 10 open during operation or should a front guard (not shown) which is mounted on the side wall 26 of the cabinet 12 and which covers the processing station 40, be lifted, the interlock switches operate to deactivate the apparatus 10. If this occurs in the middle of a processing cycle, the apparatus 10 will need to be reset.

In the general operation of the machine, the meat pieces to be processed are inserted into the feed hopper 14. The carriage 58 is in its rearmost position, ie, closest to the side wall 26 of the cabinet 12.

In operation, meat pieces to be processed are fed from the hopper 14 to the processing station 40 via the screw conveyor 20. Initially, the discharge opening 56.1 is almost aligned with the downstream end of the tubular member 52. As meat pieces are driven by the screw conveyor 20 through the discharge opening 56.1 the meat pieces are engaged by the comb 34.1 or 34.2, as the case may be, to effect the required working on the meat pieces. Also, initially, the pressure plate 72 is close to the discharge opening 56.1 of the sleeve 40. Pressure exerted on the meat pieces is controlled by the rams 60. As more meat pieces are fed by the conveyor 20 to the processing station 40, the carriage 58 is urged towards the free ends of the beams 62.

When a "log" of meat product of the desired length has been processed, this is sensed by a sensor (not shown) and drive to the screw conveyor 20 is stopped. This, in turn, stops the feed of meat pieces to the processing station 40. The pressure plate 72 is raised to open the opening 68. The carriage 58 is driven on its return stroke to discharge the log through the opening 68.

Once the log has been discharged from the processing station 40, the pressure plate 72 moves down to close the opening 68 and the processing of a further batch of meat pieces can be effected to form a succeeding log of meat product.

The use of variable speed motors 78, 82 and 84 allows the apparatus 10 to cope with variations in meat pieces throughput. It also facilitates use of frozen meat pieces in forming restructured meat products. Further, the use of a variable speed drive for the screw conveyor 20 allows varying production rates to be achieved. A capacity of up to one metric tonne per hour is possible with the apparatus 10.

The variable speed on the comb 34 allows varying degrees of work to be imparted to the meat pieces in the processing station 40. The degree of work can affect texture, protein extraction and meat tenderisation. This is enhanced by the variable pressure imparted by the pressure plate 72, via the air rams 60 on the meat pieces in the processing station 40. The higher the pressure imparted by the plate 72, the more work on the meat pieces results. This results in a tighter texture of meat product or more protein extraction in the case of extended meat product production.

In the formation of restructured meat products, the comb 34.1 is used. While the carriage 58 is in its rear most position, the end of the shaft 38 is accessible through the opening 68 in the holder 70. Thus, the comb 34.1 can be attached without disassembling the processing station 40.

The meat pieces to be processed are placed in the feed hopper 14 and are fed by the screw conveyor 20 to the processing station. The ability of the apparatus 10 to vary throughput, comb speed and pressure allows a better, more uniform product to be produced. Further, the ability of the apparatus 10 to handle frozen raw materials allows more delicate materials to be reformed and obviates the need to use functional additives and ingredients. Specific examples are the formation of meat logs made of fish and other seafood meats. In this regard it should be noted that, when using frozen materials, the increase in temperature during reforming is less than 4° C. which is critical in light of food safety standards.

The resulting log of product can be used for steak like products by simply slicing it. Instead, the "log" can be reshaped into pieces such as strips for stir-fry and cubes for kebab-like products.

In the restructuring of the meat pieces to form the "log", the teeth 90 of the comb 34.1 serve to "wrap" the fibres of the meat pieces together resulting in a more tightly textured product.

In the manufacture of extended meat products, the meat pieces to be used in the meat product are inserted into the feed hopper 14 together with other ingredients and additives such as curing and binding agents including water, nitrite, phosphates, seasonings, spices, sugars, thickening agents and proteinaceous agents such as soy, gluten and plasma. However, due to the nature of the comb 34.2 which is used in the formation of extended meat products and, more particularly, its prongs or teeth 96, the extraction of protein from meat pieces being processed at the processing station 40 is increased in comparison with other apparatus of which the applicant is aware. This is also enhanced by the pressure imparted to the meat pieces in the processing station 40 due to the rams 60. As a result, the applicant has found that it is, in fact, able to produce extended meat products without the need for phosphates.

The comb 34 is driven independently of the screw conveyor 20 so that the working of the meat products in the processing station 40 is enhanced. For example, the screw conveyor 20 can be driven at a speed of approximately 800 rpm while the comb 34 is driven at a rotational speed of approximately 1200 rpm. With this arrangement, the prongs 96 work on the meat product in the processing station 40 improving protein extraction from the meat product while greatly increasing the tenderising of the meat product.

With the apparatus 10, meat pieces are passed through the apparatus 10 at rates of up to 1 tonne per hour. The end product or "log" discharged from the processing station 40 can be then placed in a casing and cooked. There is no need for refrigerated conditions as chilled meat products can be throughput in the apparatus 10 without a significant increase in temperature. In fact, a better result is achieved if the apparatus 10 is operated at normal factory temperatures. A normal factory pressure in the production of meat products is of the order of 10° C. or less.

Extended meat products can vary from one 100 parts of meat plus 10 parts of extension solution up to 100 parts of meat plus 150 parts of extension solution.

A further benefit of the apparatus is that, extended meat products can be made without the need for injectors. Extension products have been made using the apparatus 10 simply by mixing downsized meat pieces with the extension solution in the feed hopper 14 and passing this mixture to the processing station 40 by means of the conveyor 20. In addition, throughput of the apparatus 10 can be increased by simply increasing the diameter of the screw conveyor 20 and the diameters of the tubular members 42 and 52 and the sleeve 56. The increased diameter will simply impart more "massaging" work to a meat mixture in the processing station 40. Thus, the apparatus 10 can be offered with different diameter screw conveyors 20, tubular members 42 and 52 and sleeve 56. The boss 48 defining the outlet opening 24 in the side wall 26 of the cabinet 12 can also be varied to provide the larger diameter of finished meat product.

It is an advantage of the invention that an apparatus 10 is provided for the production of meat products which can be operated at ambient, factory conditions without the need for specialised refrigeration.

In the formation of extended meat products, the need for injectors is also obviated as is the need for phosphates in certain circumstances.

The variable speed available for driving the screw conveyor 20, comb 34 and paddle 28 also enhances the versatility of the apparatus 10.

Still further, because frozen meat pieces can be used in the apparatus 10, meat product can be produced through the apparatus 10, placed in a casing and immediately cooked in a continuous operation.

It is a further advantage of the invention that the apparatus 10 comprises fewer components as, for example, only a single screw conveyor 20 is required which is mounted in a floor of the feed hopper 14. This has the added advantage that the size and footprint of the apparatus 10 are reduced.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An apparatus for the production of meat products, the apparatus including:
   a support structure;
   a container mounted on the support structure;
   a conveying means having a first, upstream end in communication with the container and a second, downstream end arranged downstream of the first end and outside the container;
   a working means arranged downstream of the second end of the conveying means for working meat conveyed to the working means by the conveying means, the working means being operable independently of the conveying means; and
   a processing station arranged downstream of the working means, the processing station, together with the working means, processing the meat to obtain a desired finished product,
   wherein the working means is in the form of a comb arranged proximate the second end of the conveying means.

2. The apparatus of claim 1, in which the container is a feed hopper.

3. The apparatus of claim 2, which includes an agitating means carried in the feed hopper.

4. The apparatus of claim 1 in which the conveying means is a screw conveyor.

5. The apparatus of claim 4, in which the first end of the screw conveyor is received in a bottom of the container, the screw conveyor having a part extending through an opening in a wall of the container.

6. The apparatus of claim 5, in which the part of the screw conveyor extending beyond the container is housed in a tubular member mounted about the opening of the container.

7. The apparatus of claim 1, in which the processing station comprises a housing displaceably arranged relative to the conveying means, the housing defining a discharge opening, downstream of the working means, through which the finished product is discharged.

8. The apparatus of claim 7, in which the processing station comprises a pressuring means for pressuring the meat in the processing station.

9. The apparatus of claim 8, in which the pressuring means is a pressure plate which openably closes the discharge opening of the housing.

10. The apparatus of any one of claims 7 to 9 in which the processing station includes a control means for controlling displacement of the housing relative to the tubular member for controlling pressure applied to meat in the processing station.

11. The apparatus of claim 1, in which the comb includes a disc and a plurality of prongs or teeth extending from the disc.

12. The apparatus of claim 11 wherein the comb is mounted at the end of a comb shaft, the comb shaft being co-axially received in a passage extending through the conveying means.

13. The apparatus of claim 12, further comprising a drive arrangement comprising a first drive means for rotatably driving the conveying means and a second drive means for rotatably driving the comb shaft, independently of the conveying means.

14. A meat product produced by an apparatus as claimed in claim 1.

15. The meat product of claim 14 which is an extended meat product.

16. The meat product of claim 15 which is substantially phosphate-free.

* * * * *